Patented Dec. 6, 1949

2,490,358

UNITED STATES PATENT OFFICE 2,490,358

PROCESS FOR THE MANUFACTURE OF VITAMIN A-ACETATE

Otto Isler, Waldemar Guex, and Peter Treadwell, Basel, Switzerland, assignors to Hoffmann-La Roche Inc., Nutley, N. J., a corporation of New Jersey No Drawing. Application April 7, 1948, Serial No. 19,636. In Great Britain May 6, 1947

6 Claims. (Cl. 260—488)

The present invention relates to a process for the manufacture of vitamin A-acetate.

It has been found, according to the present invention, that vitamin A-acetate may be obtained in good yield by a process comprising condensing, by means of a Grignard-reaction, 4-(2',6',6'-trimethyl-cyclohexene-(1')-yl)-2-methyl-butene-(2)-al-(1) with 1-hydroxy-3-methyl-pentene-(2)-yne-(4), hydrolyzing and purifying the 1,6-dihydroxy-3,7-dimethyl-9-trimethyl-cyclohexenyl-nonadiene-(2,7)-yne-(4) obtained and then partially acetylating the same by gradual addition of one mol of acetyl-chlorine in basic solution at a temperature under 0° C., partially hydrogenating at the triple bond the acetyl compound by the action of one mol of hydrogen in the presence of a palladium-charcoal catalyst, onto which quinoline has been adsorbed prior to use, purifying the 1-acetoxy-3,7-dimethyl-6-hydroxy-9-trimethyl-cyclohexenyl-nonatriene-(2,4,7) formed, dissolving the same in an organic base, and adding to the solution an equimolecular quantity of phosphorus oxychloride and heating the mixture, preferably in the presence of an inert solvent, such as toluene. It is, for instance, advantageous to react upon the purified 1-acetoxy-3,7-dimethyl-6-hydroxy-9-trimethyl-cyclohexenyl-nonatriene-(2,4,7) in pyridine solution with an equimolecular quantity of phosphorus-oxychloride at 95° C. in the presence of toluene. The purification of the 1-acetoxy-3,7-dimethyl-6-hydroxy-9-trimethyl-cyclohexenyl-nonatriene-(2,4,7) may be effected by separating the reaction mixture between petroleum ether and aqueous methanol. The partial acetylation of 1,6-dihydroxy-3,7-dimethyl-9-trimethyl-cyclohexenyl-nonadiene-(2,7)-yne-(4) can suitably be carried out by dissolving the same in pyridine and adding thereto in the presence of an inert solvent, such as petroleum ether, at a temperature of −15° C., one mol of acetyl-chloride in the course of 24 hours. The 1,6-dihydroxy-3,7-dimethyl-9-trimethyl-cyclohexenyl-nonadiene-(2,7)-yne-(4), obtained by Grignard-reaction, may be purified by crystallization from a solution of petroleum ether.

By the methods described, vitamin A-acetate is obtained, possessing the same biological activity as vitamin A-acetate obtained from natural sources. The acetate obtained by the present process may be hydrolysed to yield free vitamin A. The product of the present process is characterised by causing a maximum of absorption in the ultra-violet spectrum at 328 m$\mu$ and by the colour reactions with antimony trichloride (maximum of absorption at 620 m$\mu$ and at 580 m$\mu$).

The product of the present invention may be purified by the same methods as high concentrates of vitamin A and its derivatives from natural sources (separation between solvents, chromatographic adsorption, careful distillation and crystallisation). Like natural vitamin A, the product should be protected from the deteriorating effects of light, air and heat. It is advisable to add anti-oxidants which may be present during the whole course of the synthesis; tocopherols are particularly suitable as anti-oxidants.

The vitamin A-acetate, as obtained by the present process, shows the full biological activity of vitamin A and the acetate thereof obtained from natural sources. As compared with the free alcohol, the highly active viatmin A-acetate has the advantage of greater stability. The vitamin A-acetate is particularly stable, can be prepared easily and is obtainable in crystallised form.

Example

A solution of 18 parts by weight of 1-hydroxy-3-methyl-pentene-(2)-yne-(4) in 50 parts by volume of ether is added, in the course of one hour, to a vigorously stirred boiling solution of ethyl magnesium bromide, prepared from 10 parts by weight of magnesium, 50 parts by weight of ethyl bromide and 100 parts by volume of ether. The mixture is refluxed for 3 hours on an oil-bath of 60–70° C., whereupon 33 parts by weight of 4-(2',6',6'-trimethyl-cyclohexene-(1')-yl)-2-methyl-butene-(2)-al-(1) in 50 parts by volume of ether are added in the course of one hour while cooling with ice, and the mixture is refluxed for 3 hours. After cooling down, the reaction solution is poured into a mixture of 40 parts by weight of ammonium chloride and 200 parts by weight of ice, while stirring. The hydrolysed condensation product is taken up in ether, washed successively with 5 per cent. sulphuric acid and water, dried and concentrated. In order to separate by-products, the residue is dissolved in 75 per cent. methanol, and the solution is extracted with petroleum ether of boiling range 30–70° C. The light-yellow methanol solution is diluted with water, and the 1,6-dihydroxy-3,7-dimethyl-9-trimethyl-cyclohexenyl - nonadiene-(2,7)-yne-(4) precipitating thereby is taken up in petroleum ether and isolated therefrom. It is a yellow, very viscous oil of $n_D^{20}=1.535$ showing only terminal absorption in an ultra-violet absorption spectrum. The yield is about 88% of the theoretical. A crystalline form, of melting point 57° C., of the 1,6-dihydroxy-3,7-dimethyl-9 - trimethyl - cyclohexenyl - nonadiene - (2,7) - yne-(4) may be obtained from the yellow oil by dissolving the same in petroleum ether of boiling range 30–60° C. and cooling the same to −15° C.

1 part by weight of 1,6-dihydroxy-3,7-dimethyl-9-trimethyl-cyclohexenyl-nonadiene-(2,7) - yne-(4) is dissolved in 5 parts by volume of pyridine and 5 parts by volume of petroleum ether, and a solution of 0.29 part by weight of acetyl chloride in 5 parts by volume of petroleum ether are added thereto in the course of 24 hours at −20° C. The reaction solution is poured on a mixture of ice and water. The petroleum ether solution is washed successively with normal sulphuric acid, aqueous sodium bicarbonate solution and water, dried with potassium carbonate and concentrated. 1.1 part by weight of 1-acetoxy-3,7-dimethyl - 6-hydroxy - 9-trimethyl - cyclohexenyl-nonadiene-(2,7)-yne-(4) is obtained as a yellow oil of $n_D^{21}=1.518$.

1 part by weight of this partially acetylated compound is dissolved in 5 parts by volume of methyl alcohol, whereupon one mol of hydrogen is added thereto at room temperature in the presence of 0.1 part by weight of 4 per cent. palladium charcoal, onto which quinoline has been adsorbed prior to use. Hydrogenation is then discontinued, the catalyst is filtered off, the filtrate is diluted with water and the reaction product is extracted with petroleum ether. Dihydroxy compounds are removed from the petroleum ether solution by extraction with dilute aqueous methanol. Thereafter, 1-acetoxy-3,7-dimethyl-6-hydroxy-9-trimethylcyclohexenyl-nonatriene-(2,4,7) is extracted with 95 per cent. methanol and isolated therefrom in the usual manner. The substance is a viscous oil of $n_D^{21}=1.5140$; $d_4^{24}=0.9965$.

1 part by weight of 1-acetoxy-3,7-dimethyl-6-hydroxy-9-trimethyl - cyclohexenyl - nonatriene-(2,4,7) in 3 parts by volume of toluene is added, at a bath-temperature of 95° C., to a solution of 0.33 part by volume of phophorus-oxychloride in 2 parts by volume of pyridine and 4 parts by volume of toluene. The mixture is stirred for 30 minutes, then diluted with petroleum ether, poured on ice, and the petroleum ether solution is washed successively with normal sulphuric acid, sodium bicarbonate solution and 92 per cent. methanol and water and dried with sodium sulphate, whereupon the solvent is evaporated. The crude product thus obtained, a red-brown oil of $n_D^{20}=$about 1.560, may be purified by chromatographic absorption (for instance, percolation chromatogram onto an aluminum oxide column) and by crystallisation (for instance, from a mixture of acetone and fine spirit).

The course of the reaction described in the instant application may be graphically illustrated by the following chart in which the symbol R represents the following portion of the molecule:

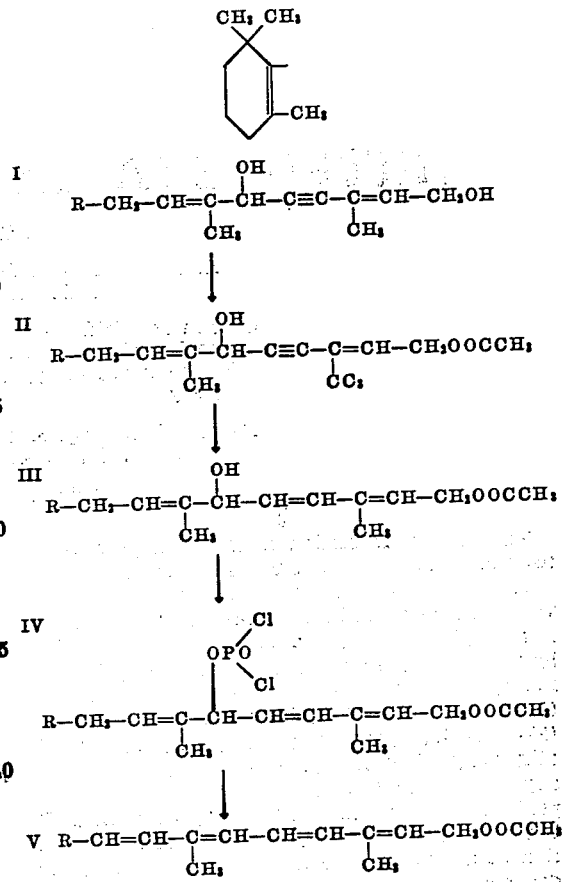

We claim:
1. Process which comprises partially acetylating 1,6-dihydroxy-3,7-dimethyl-9-[2',6',6'-trimethyl-cyclohexene-(1')-yl] - nonadiene - (2,7)-yne-4 with acetyl-chloride in basic solution at a temperature below 0° C. to form the corresponding 1-acetoxy-6-hydroxy compound, hydrogenating said acetoxy compound to form 1-acetoxy-3,7-dimethyl-6-hydroxy-9-[2',6',6'-trimethyl - cyclohexene-(1')-yl]-nonatriene-(2,4,7), and thereafter reacting said nonatriene with phosphorous oxychloride to produce vitamin A acetate.

2. Process which comprises reacting 1-acetoxy-3,7-dimethyl-6-hydroxy-9-[2',6',6'-trimethyl-cyclohexene-(1')-yl]-nonatriene-(2,4,7) with phosphorus oxychloride to form vitamin A acetate.

3. Process which comprises reacting 1-acetoxy-3,7-dimethyl-6-hydroxy-9-[2',6',6'-trimethyl-cyclohexene-(1')-yl]-nonatriene-(2,4,7) with phosphorus oxychloride to form vitamin A acetate, the reaction being carried out in the presence of an organic base.

4. Process which comprises reacting 1-acetoxy-3,7-dimethyl-6-hydroxy-9-[2',6',6'-trimethyl-cyclohexene-(1')-yl]-nonatriene-(2,4,7) with phosphorous oxychloride to form vitamin A acetate, the reaction being carried out in the presence of toluene and pyridine.

5. Process which comprises reacting 1-acetoxy-3,7-dimethyl-6-hydroxy-9-[2',6',6'-trimethyl-cyclohexene-(1')-yl]-nonatriene-(2,4,7) with phosphorous oxychloride to form vitamin A acetate, the reaction being carried out with an equimolecular amount of phosphorus oxychloride.

6. Process which comprises reacting 1-acetoxy-3,7-dimethyl-6-hydroxy-9-[2',6',6'-trimethyl-cyclohexene-(1')-yl]-nonatriene-(2,4,7) with phosphorous oxychloride to form vitamin A acetate, a temperature of 95° C. being employed in the reaction.

OTTO ISLER.
WALDEMAR GUEX.
PETER TREADWELL.

REFERENCES CITED

The following references are of record in the file of this patent:

UNITED STATES PATENTS

| Number | Name | Date |
|---|---|---|
| 2,369,157 | Milas | Feb. 13, 1945 |
| 2,369,159 | Milas | Feb. 13, 1945 |
| 2,412,465 | Milas | Dec. 10, 1946 |

OTHER REFERENCES

Isler et al., Helv. Chim. Acta 30, 1911–1927 (1947).

Certificate of Correction

Patent No. 2,490,358　　　　　　　　　　　　　　　　　December 6, 1949

OTTO ISLER ET AL.

It is hereby certified that errors appear in the printed specification of the above numbered patent requiring correction as follows:

Column 1, line 13, for the word "chlorine" read *chloride*; column 4, line 24, for that portion of the formula reading "CC$_3$" read *CH$_3$*;

and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*